(12) United States Patent
Ferroni

(10) Patent No.: US 11,887,336 B2
(45) Date of Patent: Jan. 30, 2024

(54) METHOD FOR ESTIMATING A RELATIVE POSITION OF AN OBJECT IN THE SURROUNDINGS OF A VEHICLE AND ELECTRONIC CONTROL UNIT FOR A VEHICLE AND VEHICLE

(71) Applicant: Argo AI GmbH, Munich (DE)

(72) Inventor: Francesco Ferroni, Munich (DE)

(73) Assignee: ARGO AI GmbH, Munich (DE)

( * ) Notice: Subject to any disclaimer, the term of this patent is extended or adjusted under 35 U.S.C. 154(b) by 569 days.

(21) Appl. No.: 17/258,990

(22) PCT Filed: Jul. 5, 2019

(86) PCT No.: PCT/EP2019/068119
§ 371 (c)(1),
(2) Date: Jan. 8, 2021

(87) PCT Pub. No.: WO2020/011670
PCT Pub. Date: Jan. 16, 2020

(65) Prior Publication Data
US 2021/0287022 A1 Sep. 16, 2021

(30) Foreign Application Priority Data
Jul. 9, 2018 (EP) .................................... 18182496

(51) Int. Cl.
*G06T 7/73* (2017.01)
*G06N 3/08* (2023.01)
(Continued)

(52) U.S. Cl.
CPC .............. *G06T 7/75* (2017.01); *G06F 18/214* (2023.01); *G06N 3/08* (2013.01); *G06V 20/58* (2022.01); *G06V 20/64* (2022.01)

(58) Field of Classification Search
None
See application file for complete search history.

(56) References Cited

U.S. PATENT DOCUMENTS

| 2012/0314030 | A1 | 12/2012 | Datta et al. | |
| 2019/0317519 | A1* | 10/2019 | Chen | ........................ G06T 7/344 |
| 2021/0089794 | A1* | 3/2021 | Chen | ...................... G06V 10/82 |

FOREIGN PATENT DOCUMENTS

EP 1 727 087 A1 11/2006

OTHER PUBLICATIONS

International Preliminary Report on Patentability, dated Jan. 21, 2021, in International Application No. PCT/EP2019/068119 (7 pages).

(Continued)

*Primary Examiner* — Leon Flores
(74) *Attorney, Agent, or Firm* — STAAS & HALSEY LLP

(57) ABSTRACT

A relative position of an object in the surroundings of a vehicle is estimated based on a two-dimensional camera image. A control unit determines an object contour of the object from the camera image and determines at least one digital object template that represents the object based on the object contour. The control unit forward projects the at least one object template from respective different positions onto an image plane of the camera image. Each forward-projected object template yields a respective two-dimensional contour proposal, and the control unit compares the contour proposals with the object contour of the object.

20 Claims, 6 Drawing Sheets

Figure 1:
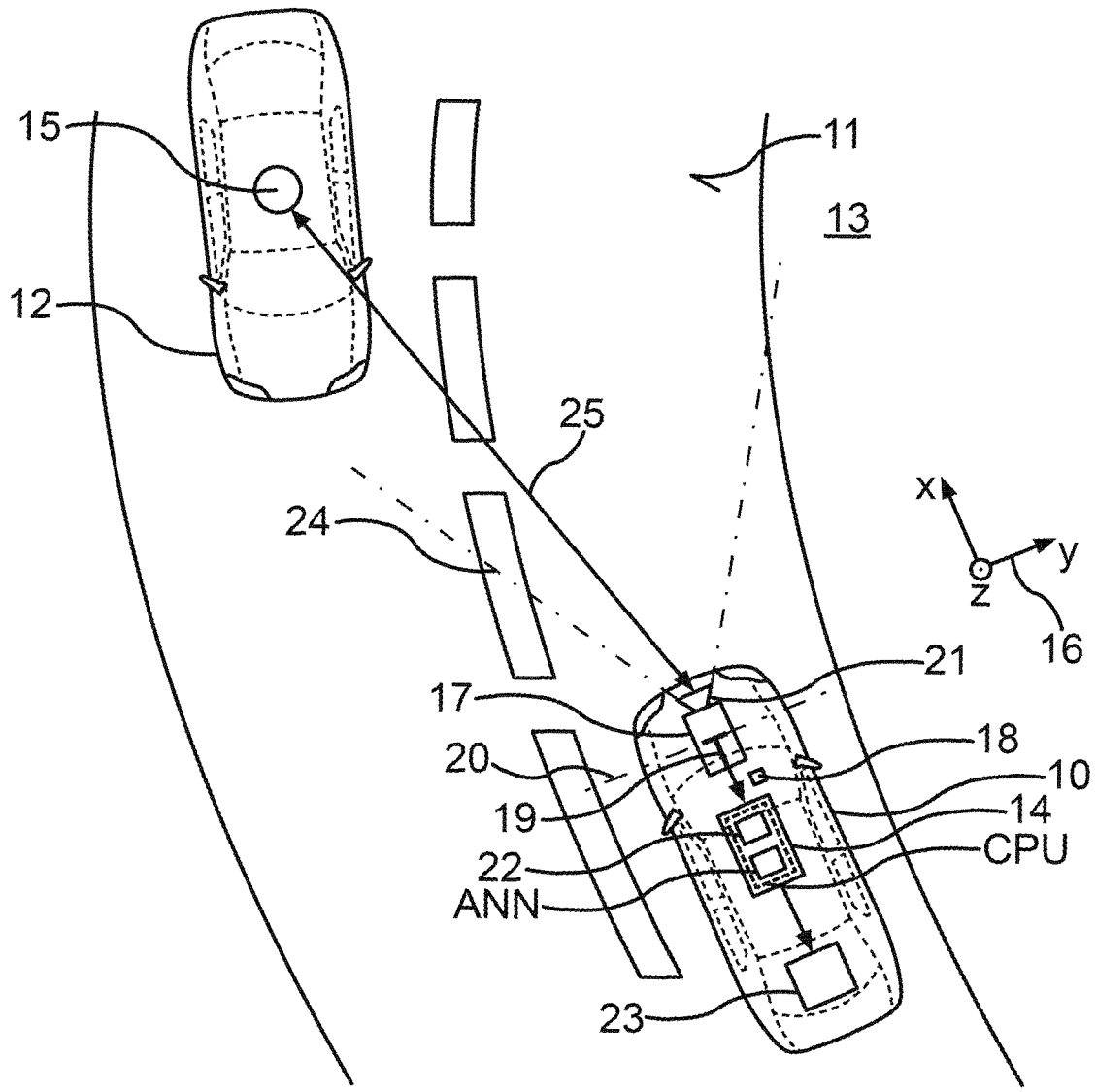

(51) Int. Cl.
G06V 20/58 (2022.01)
G06V 20/64 (2022.01)
G06F 18/214 (2023.01)

(56) References Cited

OTHER PUBLICATIONS

Alexander Grabner, et al: "3D Pose Estimation and 3D Model Retrieval for Objects in the Wild," Mar. 30, 2018, Retrieved from the Internet: arxiv.org/pdf/1803.11493.pdf, pp. 1-13.
Michael Hödlmoser et al: "Classification and Pose Estimation of Vehicles in Videos by 3D Modeling within Discrete-Continuous Optimization," 3D Imaging, Modeling, Processing, Visualization and Transmission (3DIMPVT), 2012 Second International Conference on, Oct. 1, 2012, pp. 198-205, DOI: 10.1109/3DIMPVT.2012.23 ISBN: 978-1-4673-4470-8.
International Search Report (Forms PCT/ISA/210; PCT/ISA/220); dated Aug. 30, 2019, in International Patent Application No. PCT/EP2019/068119 (5 pages).
Written Opinion (Form PCT/ISA/237); dated Aug. 30, 2019, in International Patent Application No. PCT/EP2019/068119 (9 pages).
PCT/EP2019/068119, Jul. 5, 2019, Francesco Ferroni, Argo AI GmbH.
European Application No. 18182496.2, Jul. 9, 2018, Francesco Ferroni, Argo AI GmbH.

* cited by examiner

METHOD FOR ESTIMATING A RELATIVE POSITION OF AN OBJECT IN THE SURROUNDINGS OF A VEHICLE AND ELECTRONIC CONTROL UNIT FOR A VEHICLE AND VEHICLE

CROSS REFERENCE TO RELATED APPLICATIONS

This application is filed under 35 U.S.C. § 371 as a National Stage of International Application No. PCT/EP2019/068119 filed on Jul. 5, 2019. The International Application claims the priority benefit of European Application No. 18182496.2 filed on Jul. 9, 2018. Both the International Application and the European Application are incorporated by reference herein in their entirety.

DESCRIPTION

The invention is concerned with a method for estimating a relative position, particularly a distance, of an object in the surroundings of a vehicle. The relative position can be estimated on the basis of a single 2D camera image taken by a camera of the vehicle. The invention also concerns an electronic control unit for a vehicle. The electronic control unit can perform the inventive method. Finally, the invention is concerned with a motor vehicle comprising a 2D camera and said electronic control unit.

Estimating the relative position of an object with regard to a vehicle on the basis of a 2D camera image confronts an electronic control unit with the problem that no value for the depth or distance can be determined directly from picture elements (pixels) of the camera image. The value for the distance of the object with regard to the vehicle must therefore be measured otherwise.

Document US 2016/0371549 A1 discloses a method for combining a 2D camera image and a 3D stereo camera image in a vehicle. An object is detected in both the 2D image and in the 3D image. Based on the 3D image, a 3D model of the object is generated. Starting from an image plane of the 2D image a frustum that marks the contour of the object as detected in the 2D image is back-projected onto the 3D model in order to define the correct contour of the object in the 3D model. Distance information is directly available from the 3D stereo camera image.

Document US 2014/0176679 A1 describes a method for classifying an object that has been detected in a 2D camera image. Models of several possible candidate objects are positioned in a virtual 3D space and a forward-projection of each model onto the camera image plane is calculated to obtain artificial 2D camera images. The artificial image that fits the real 2D camera image best is chosen and the corresponding model is used to describe the detected object. The method relies on a measurement of the distance by means of a radar.

It is an objective of the present invention to estimate a relative position, at least the distance, of an object in the surroundings of a vehicle on the basis of a 2D camera image as provided by a camera of the vehicle.

The object is accomplished by the subject matter of the independent claims. Advantageous developments with convenient and non-trivial further embodiments of the invention are specified in the following description, the dependent claims and the figures.

The invention provides a method for estimating a relative position of an object in the surroundings of a vehicle. Particularly, the method estimates a relative distance of the object with regard to the vehicle. As an example, the object can be another vehicle or a pedestrian or a cyclist. The method is performed by an electronic control unit of the vehicle. The electronic control unit estimates the relative position on the basis of a 2D camera image taken by a camera of the vehicle. The control unit performs several steps which are explained in the following.

In a first step, an object contour of the object is determined on the basis of the camera image. In other words, an outer line of the object or an estimate of this outer line is determined in the camera image. In a very basic implementation, such an object contour can be a 2D bounding box.

In a second step, this object contour is back-projected into a three-dimensional virtual space that represents the surroundings of the vehicle. In other words, the surroundings are represented digitally in the form of a three-dimensional virtual space. A back-projection means that starting from the image plane of the image pixels that represent the object contour, the object contour is projected along the line along which the light travelled from the surroundings through the optical element of the camera onto the image plane of the camera. The rays of light entering the camera describe the projection lines. Note that the light is forward-projected from the surroundings into the camera onto the image plane, resulting in a respective pixel value for each pixel on the image plane. Accordingly, starting from a pixel of the object contour and following the projection line for this pixel in a backward direction results in the back-projection. The back-projected object contour describes a three-dimensional virtual frustum or cone reaching from the camera into the surroundings. Of course, this is only a virtual representation in the said three-dimensional virtual space. As the frustum is based on the object contour, it is now clear that the position of the object must be somewhere inside the frustum. However, as the distance of the object is unknown, the position can be somewhere along the whole length of the frustum. Similarly, if the spatial orientation of the object is not known, the rotational or angular orientation or arrangement of the object inside the frustum is also unknown.

Thus, in a third step, at least one digital object template is determined or chosen. The choice of the at least one object template may be based on the object image as contained in the camera image or a predefined set of at least one object template may be provided. Each digital object template represents the object. The object template is a model of the object. The degree of detail of the object template can be chosen by the skilled person. A very simple object template can be a 3D bounding box that represents the object.

In a fourth step, the at least one object template is positioned at several pre-defined positions inside the frustum. As the true position of the object inside the frustum is unknown, each object template or copies of the object template are positioned at potential positions inside the frustum. These potential positions might be possible position at which the object might be placed. The positions are determined according to a predefined positioning rule. Particularly, at least some of the positions differ in regard to distance from the vehicle.

In a fifth step, the at least one object template is forward-projected from the respective different positions onto the image plane of the camera image. In other words, a respective virtual camera image is generated by forward-projecting a respective object template from one of the positions onto the image plane. For each object template and each position, there then exists a virtual camera image that can be compared with the real camera image that shows the actual object. The respective virtual image of each forward-pro jected object template can be treated in the same way as the real camera image in that a contour of the forward-projected object template can be determined. This resulting contour is termed "contour proposal" in the following. Accordingly, each forward-projected object template yields a respective two-dimensional contour proposal. Note that the further the object template is positioned away from the image plane, the smaller the size of the contour proposal will be. Thus, if an object template describes the correct object and its position is at the correct distance of the object to the camera, the contour proposal will be very similar or equal to the true object contour.

In a sixth step, the contour proposals are compared with the object contour of the object. The comparison comprises that a predefined matching criterion is verified. At least one contour proposal can fulfill the matching criterion with regard to the true object contour. From all the contour proposals that fulfill the matching criterion at least one contour proposal is selected as a respective best-fit contour proposal. Each best-fit contour proposal fulfills the matching criterion. In other words, a degree of similarity between the contour proposal and the true object contour is larger than a predefined threshold. However, not every contour proposal that fulfills the matching criterion must be selected as a respective best-fit contour proposal, which is explained later.

In a seventh step, the relative position of the object is determined on the basis of the respective position of the corresponding object template that led to the at least one selected best-fit contour proposal. In other words, as each selected best-fit contour proposal has been generated on the basis of a respective object template that has been positioned inside the frustum at a specific respective position, this position can be used as a proposal for the true relative position of the object with regard to the vehicle. If more than one best-fit contour proposal is selected, one can determine the true relative position of the object, e.g., as a mean value of the several positions. The mean value can be determined as a mean value of vectors that indicate the positions.

The method provides the advantage that no explicit measurement of the distance of the object with regard to the vehicle is needed. The relative position of the object with regard to the vehicle can be determined on the basis of a 2D camera image.

The invention also comprises embodiments that provide additional technical advantages.

In one embodiment, as was already indicated, a 2D bounding box that is of rectangular shape is used as the object contour. In other words, a rectangle is chosen wherein each edge of the rectangle touches the object image of the object in the camera image. Another term for such a bounding box is a "tight bounding box". A bounding box provides the advantage that the back-projection can be performed with less calculation steps in comparison to a contour that comprises curved lines. It is only necessary to back-project the corners of the bounding box. The remaining edges can be interpolated without any further back-projection calculations.

In one embodiment, each object template represents a specific object type and object size (object dimensions) and spatial orientation. Examples for a respective object type are each: a vehicle, a pedestrian, a cyclist. For each object type, one or more than one object size can be modelled by a respective object template. E.g., three different sizes result in three different object templates for this object type. Additionally, each object template models the object with a respective spatial orientation with regard to the vehicle. The spatial orientation can be defined as the angle of rotation around a vertical axis. For example, the spatial orientation can be a value of degrees of orientation. One object template can provide a spatial orientation of zero degrees and another object template can provide a spatial orientation of ninety degrees of the same specific object type and the same object size. Zero degrees can represent an object approaching the vehicle, whereas ninety degrees can represent an object crossing from left to right or right to left. The object template does not represent a specific true object position, as this true position is determined in the described way by positioning the object template at several different positions and determining which contour proposal provides the best fit. By providing an object template that represents object type, object size and spatial orientation, it is only necessary to choose different positions inside the frustum in order to determine the relative position of the object.

As regards the number of object templates, for each object detected in a camera image, a predefined number of object templates can be chosen. If the object type of the object is also known, then only one or more object template of this object type is needed and only object size and/or spatial orientation may be varied by choosing several different object templates of that object type.

According to one embodiment, determining or choosing the at least one object template comprises that several object templates are used, wherein at least two object templates represent different (potential) object types and/or at least two object templates represent different (potential) object sizes and/or at least two object templates represent the same object type, but different (potential) spatial orientations of the object. Thus, no estimation of these features is needed, as the correct object type and/or object size and/or object orientation is determined by trial and error.

In contrast to this, according to one embodiment, for determining the at least one object template, an object classification module is used to determine an object type and/or a spatial orientation of the object on the basis of the camera image. In other words, an object classification module may determine at least one of the features object type and/or spatial orientation and/or object size on the basis of the camera image. Thus, fewer object templates may be used. An object classification module may be based on an artificial neural network. The object classification module may perform an object recognition on the basis of the camera image and/or sensor data at least one sensor and/or on communication data received from the object (e.g. via the so called car-to-car communication).

In one embodiment, each object template is a 3D bounding box. The spatial dimensions of the bounding box represent the spatial dimensions of the object (e.g. length, width and height). The spatial orientation of a longitudinal axis or a direction in which a front side of the bounding box is pointing may represent said spatial orientation of the object. The relation of length, width and height of the bounding box may represent the object type. A 3D bounding box provides the advantage that forward-projecting the object template can be done by forward-projecting only the eight corners of the 3D bounding box. The edges of the bounding box can be interpolated in the image plane without having to calculate an explicit forward-projection. This results in less computational effort.

In one embodiment, the positioning rule that is used for determining the several positions for placing the at least one object template inside the frustum comprises that several positions are used for each object template, the positions being arranged in a predefined pattern. Such a pattern can be, e.g., a raster. For example, the different positions can have a distance to each neighboring position in a range of 2 cm to 1 m. Thus, computational effort and estimation precision can be balanced. In order to further reduce the number of positions, in the three-dimensional virtual space that represents the surroundings of the vehicle, a ground plane can be presented. This ground plane is the plane on which the vehicle and the objects are arranged. In other words, the ground plane may represent a street or road or a driving ground of the vehicle. The positions can be arranged inside the frustum on the ground plane and/or on a plane parallel to the ground plane. This allows to limit the number of potential positions from which the forward-projections have to be calculated in order to generate a respective contour proposal.

In one embodiment, the matching criterion that is used for comparing the contour proposals and the (true) object contour of the object comprises that the respective contour proposal and the object contour overlap by at least a predefined minimum overlap value. The minimum overlap value can be a value larger than 70%, especially larger than 80%. In other words, the areas that are encompassed by the contour proposal on one side and the object contour on the other side can be analyzed with regard to their degree of overlap, resulting in the overlap value. This provides the advantage that the matching criterion can be verified with few and/or simple calculation operations.

In one embodiment, as was already mentioned, not all contour proposals that fulfill the matching criterion are actually selected as a respective best-fit contour proposal. Rather, a subset is selected out of all those contour proposals that fulfill the matching criterion. The reason is that if one object template that is positioned at a specific position and that results in a best-fit contour proposal, the same object template at the neighboring position (e.g. 10 cm away) will also result in a best-fit contour proposal, as the forward-projected object template will result in almost the same contour proposal. In order to reduce the number of best-fit contour proposals, the selection comprises applying a similarity criterion to the corresponding object templates and determining at least one group of similar corresponding object-templates and only selecting one corresponding object template out of each group and selecting the associated best-fit contour proposal of the selected object template. In other words, for each group of similar object templates one of these object templates represents the whole group as they are similar anyway. The similarity criterion can be a degree of overlap of the object templates, i.e. a minimum overlap value of an overlap threshold can be verified. Each object template may be a member of one group only.

In one embodiment, the final step, i.e., the determination of the relative position of the object on the basis of the respective position of each object template that led to a selected best-fit contour proposal comprises the following steps. To each selected best-fit contour proposal an artificial neural network is applied that is trained to provide correction data for the position of the corresponding object template in order to increase a degree of matching between the best-fit contour proposal and the object contour. In other words, the artificial neural network is trained to provide an indication of whether the corresponding object template should be moved further to the right/left and/or up/down and/or forward/backward (with respect to the camera or vehicle) in order to obtain a corrected forward-projection that is an even better fit or match with regard to the true object contour of the object itself. It has been observed that such an artificial neural network can be provided with little effort. Ideally, if several selected best-fit contour proposals are used, the artificial neural network should provide correction data for each selected best-fit contour proposal such that all selected best-fit contour proposals should end up at the same position inside the frustum, if the respective correction data were applied to their respective position. Using such an artificial neural network increases the preciseness of the estimate of the object position.

However, it has been observed that such an artificial neural network will not provide perfect correction data. In other words, even after applying the correction data, several possible positions will remain. In one embodiment, a mean value of the corrected positions of the object templates in question is calculated as an estimated position of the object. The mean value can be determined in the described way by calculating a mean vector of all those vectors that point to the corrected positions. By using a mean value, imperfections of the artificial neural network can be compensated.

Several embodiments concern the case that after forward-projecting all object templates from all the chosen positions, no best-fit contour proposal is yielded (i.e. the matching criterion is not fulfilled). In this embodiment, in the case that comparing the contour proposals with the object contour does not yield at least one best-fit contour proposal, as for each contour proposal the matching criterion stays unfulfilled, another strategy is chosen. This strategy comprises that a predefined object estimation module provides an estimate of an object type and an object size and a spatial orientation of the object on the basis of the camera image. In other words, it is directly estimated what type of object is shown in the camera image and which size and spatial orientation should be assumed for that object. This is possible for those cases where, in the camera image, the object image is relatively small, for example. In such a case, a direct object estimation can be performed by an object estimation module. The estimate can be expressed as a 3D bounding box as it has already been described. Now that such an object template is available, it has to be estimated how far this object template should be placed from the vehicle. In other words, an object template of the estimated object type, object size and spatial orientation is provided and back-projected inside the frustum. The question now is how far it should be back-projected. A projection distance is varied and for each value of the projection distance a contour proposal is generated by forward-projecting the back-projected object template from the respective projection distance onto the image plane. In other words, the object template is shifted away or towards the vehicle and for different projection distances, a forward-projection is performed or generated. This is done until a value for the projection distance is found for which the result of the forward-projection, i.e. the contour proposal, fulfills the matching criterion. In other words, the projection distance is chosen such that the resulting forward-projected object template yields a contour proposal that fits or matches the true object contour according to the matching criterion. This projection distance then provides an estimate of the object distance of the object in the surroundings. The remaining parameters of the relative position, i.e. lateral value (left/right) and vertical value (up/down), are also given, as at the projection distance the object template will touch the frustum on all sides such that no variation, horizontally or vertically, is possible.

In one embodiment, said object estimation module is provided as an artificial neural network. It has been discovered that such an artificial neural network can be used for estimating object type and object size and spatial orientation in the case that the object only covers a proportion of the camera image of predefined limited size. For example, if the size of the image of the object in the camera image is smaller than 200×200 pixels.

The invention also comprises the combinations of the features of the described embodiments.

In order to perform the inventive method in a vehicle, an electronic control unit for a vehicle is provided. The control unit comprises a processing unit that is designed to perform an embodiment of the inventive method. The processing unit may comprise at least one microprocessor and/or at least one microcontroller and/or at least one signal processing unit and/or at least one GPU (graphical processing unit). The method steps may be implemented by a program code that comprises programming instructions that will perform the embodiment of the inventive method if executed by the processing unit. The program code can be stored in a digital data storage of the processing unit.

Finally, the invention also provides a motor vehicle comprising a 2D camera and an electronic control unit according to the invention. The 2D camera can be a still image camera or a video camera. The motor vehicle can be a passenger vehicle or a truck.

Figure 2:
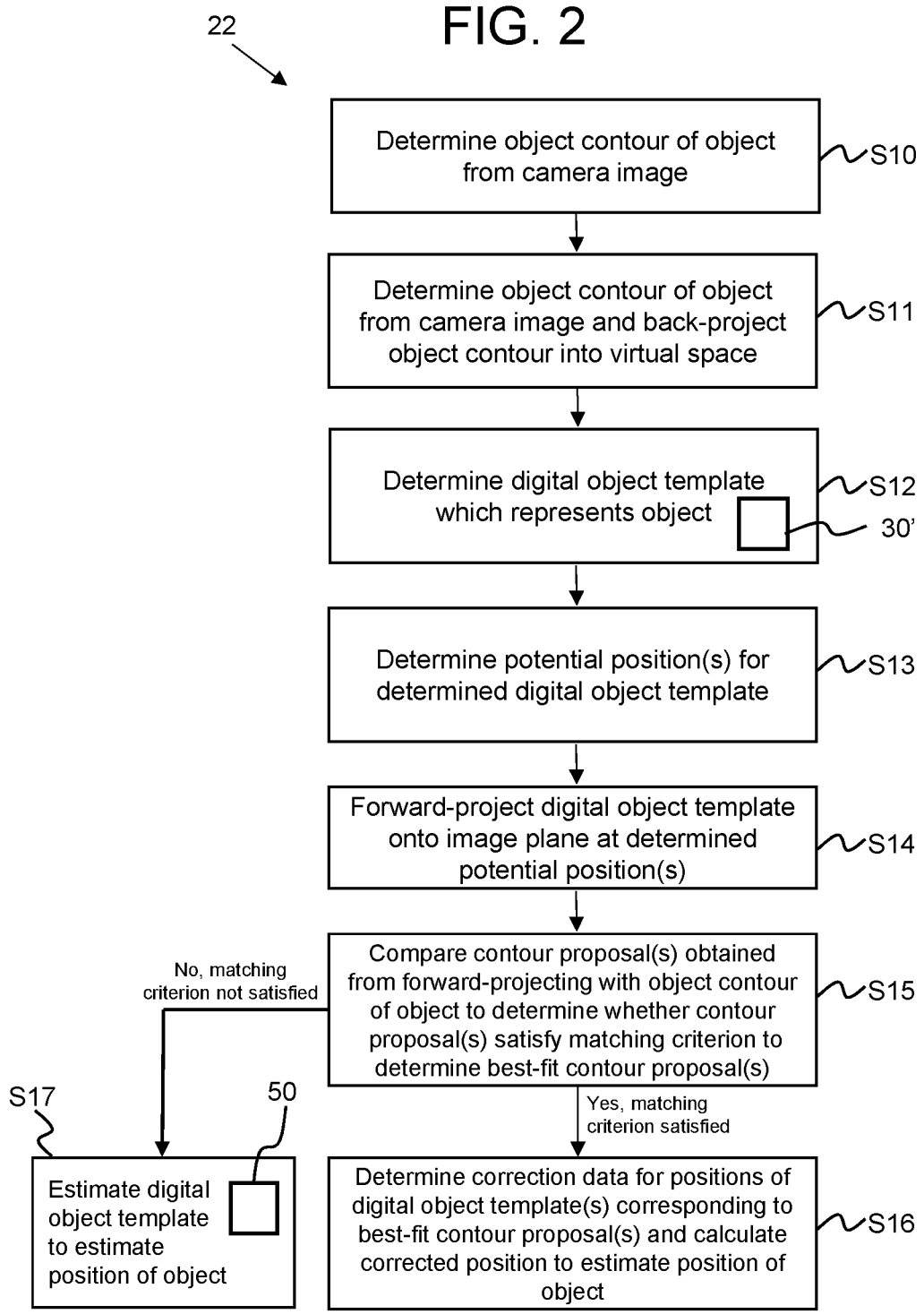
Figure 3:
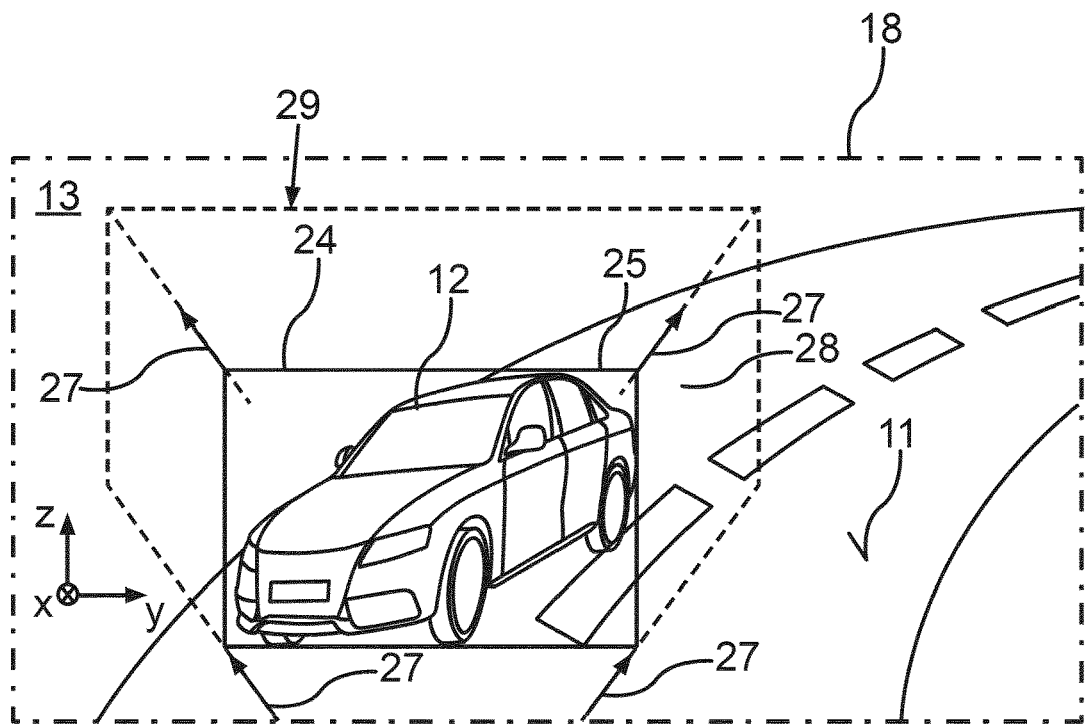

In the following, an exemplary implementation of the invention is described. The figures show:

FIG. 1 a schematic illustration of a motor vehicle according to the invention;

FIG. 2 a flow diagram of an embodiment of the inventive method as it can be performed by an electronic control unit of the vehicle of FIG. 1;

FIG. 3 a 2D camera image as it may be taken by a camera of the vehicle of

Figure 4:
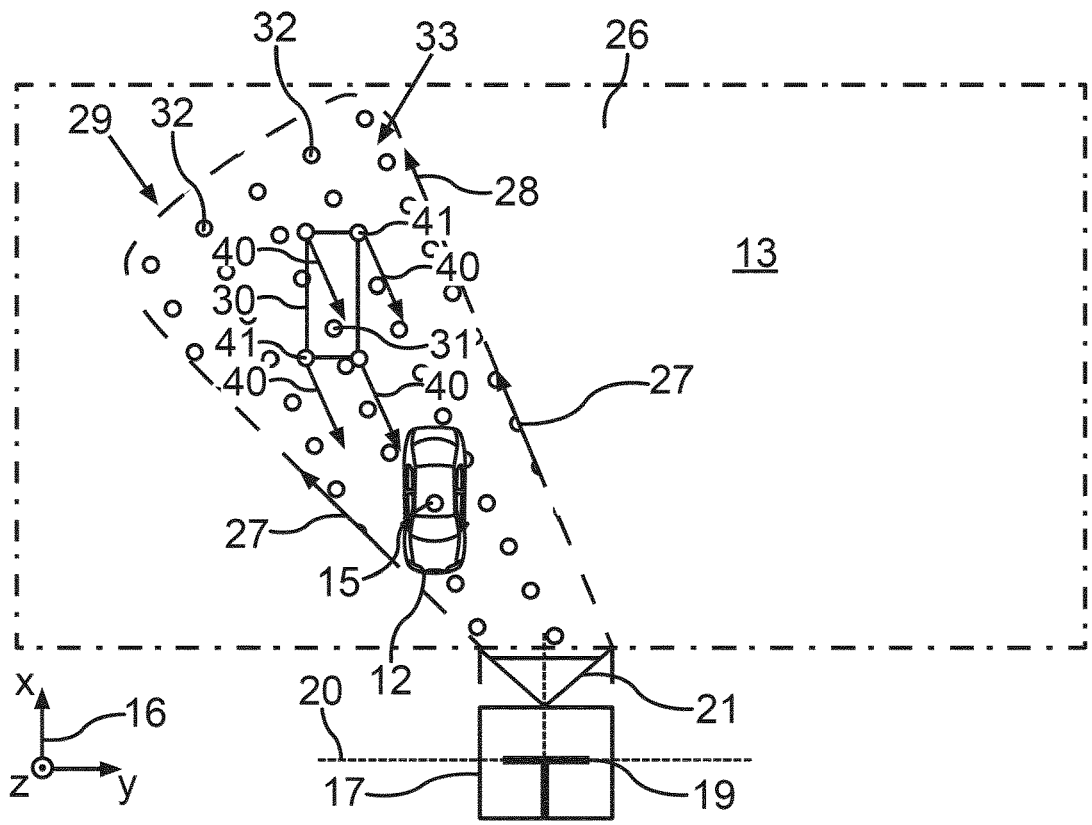
Figure 5:
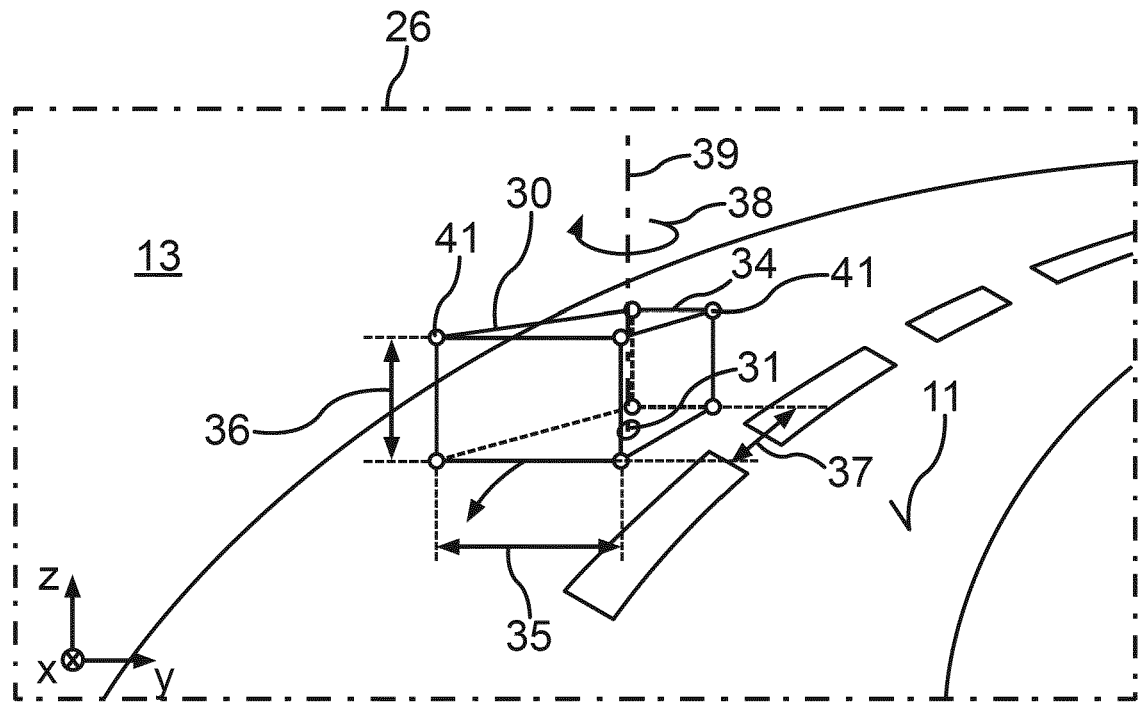
Figure 6:
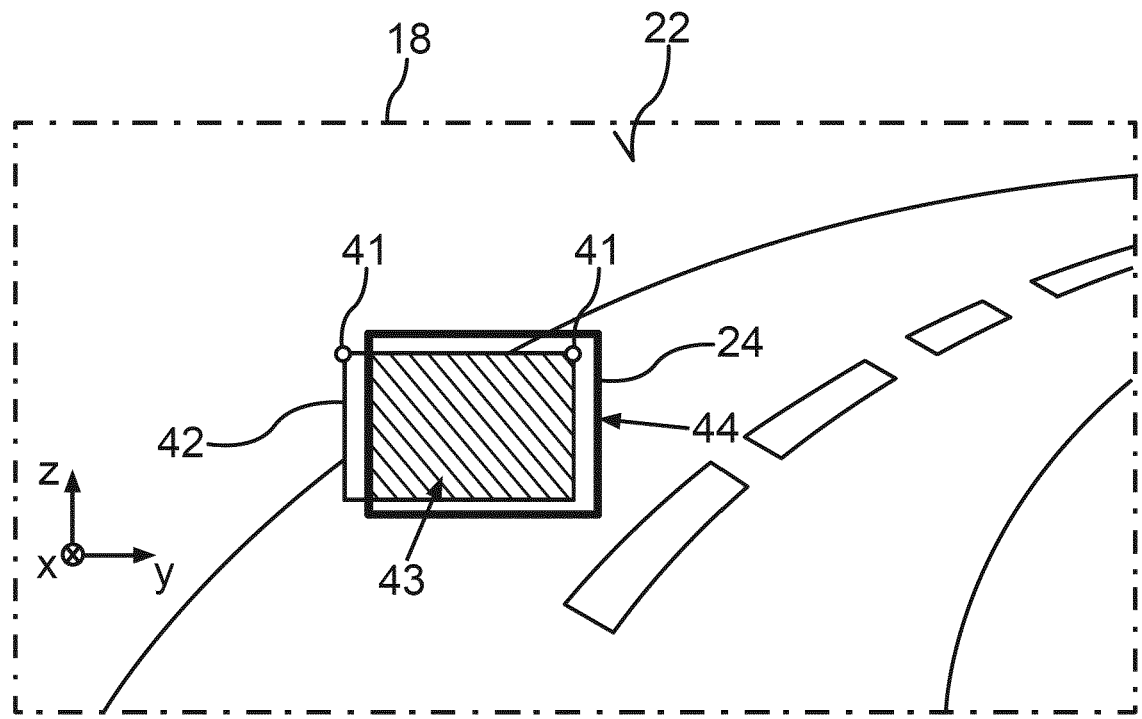
Figure 7:
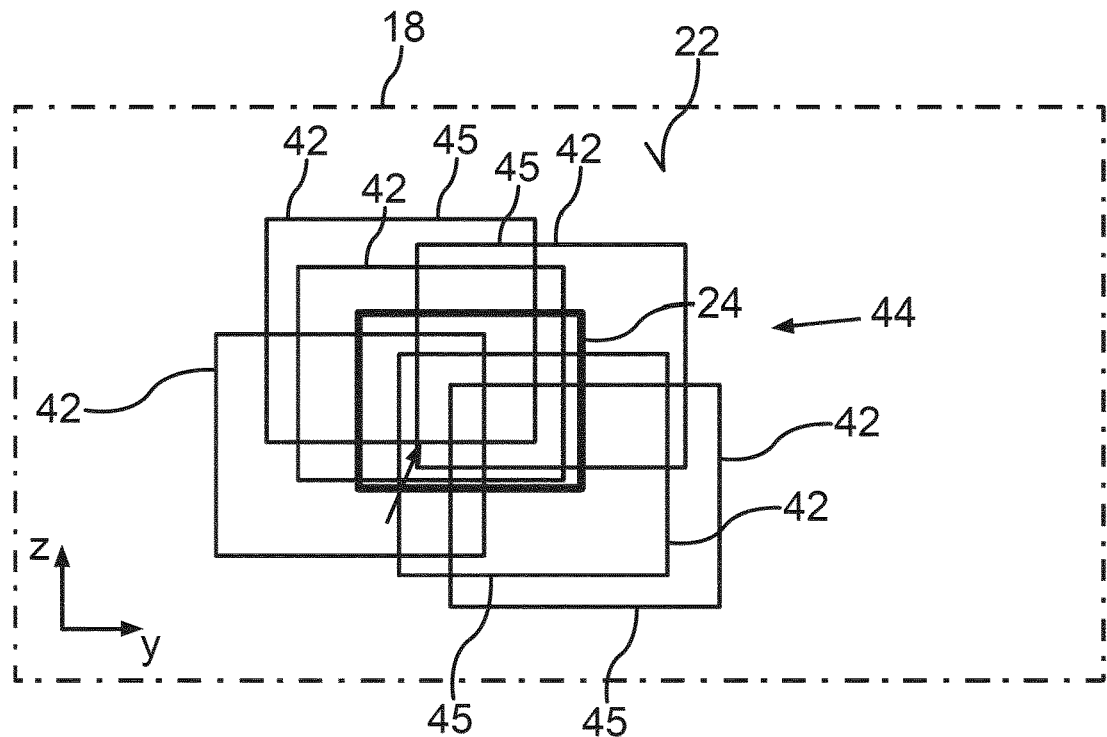
Figure 8:
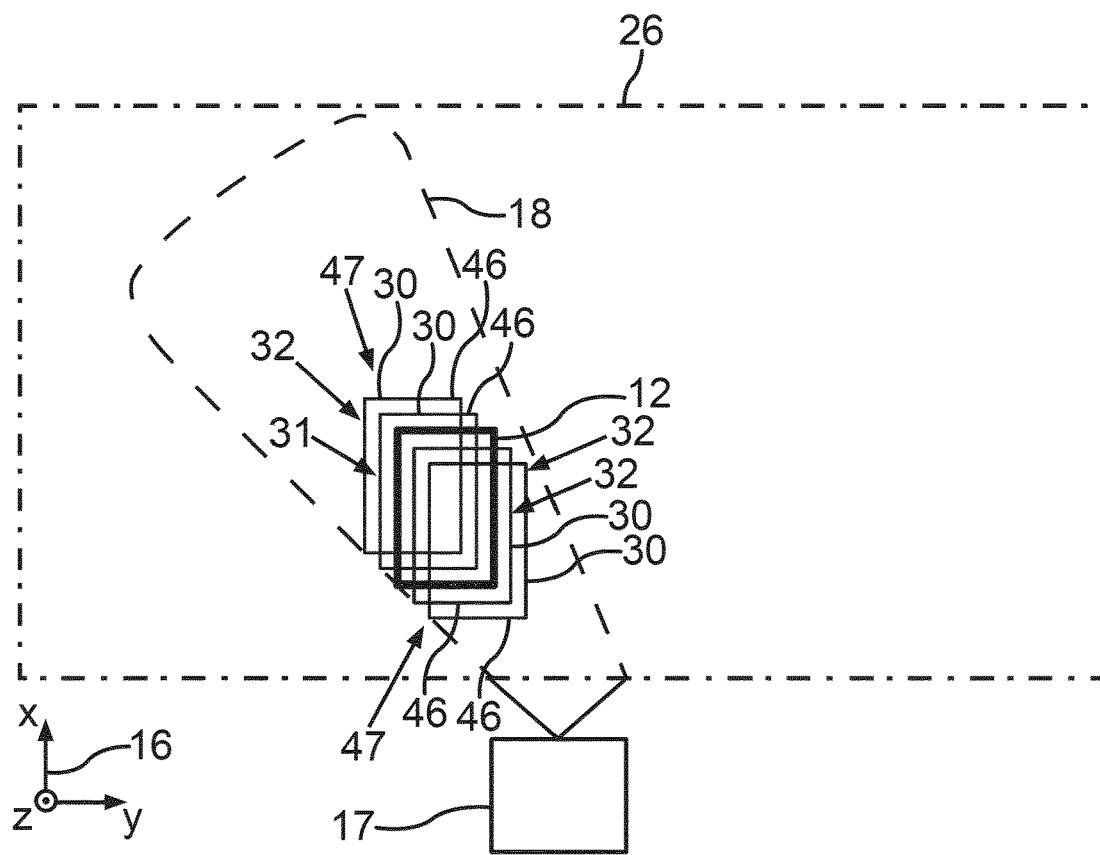
Figure 9:
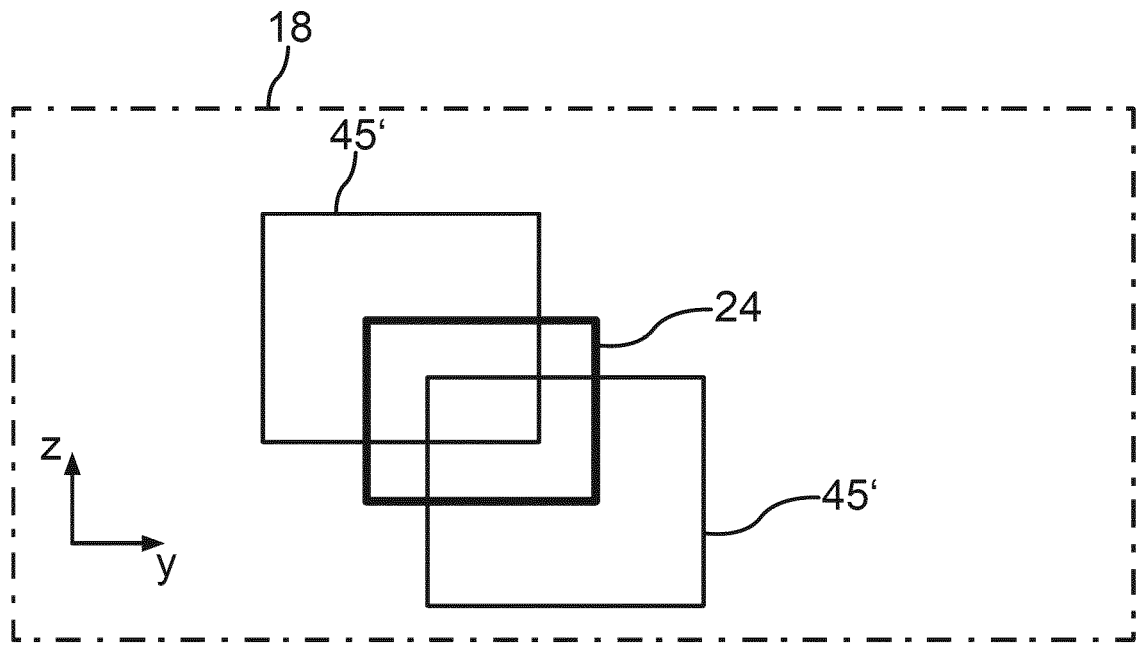
Figure 10:
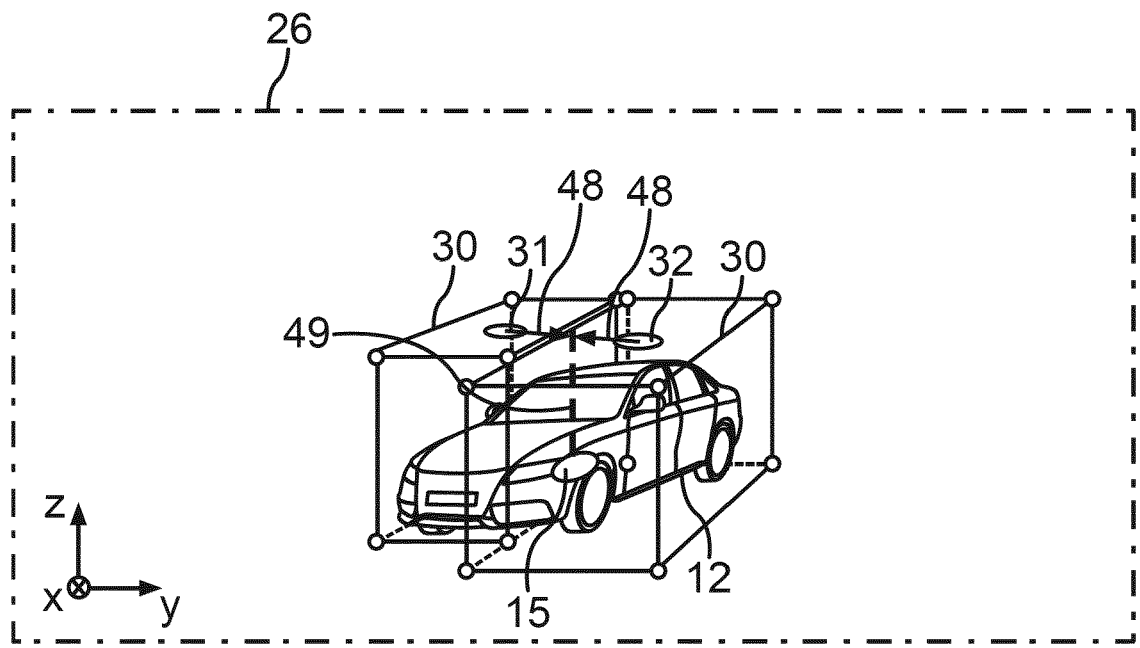

FIG. 1;

FIG. 4 a sketch of a three-dimensional virtual frustum and an object template positioned at a position inside the frustum;

FIG. 5 a schematic illustration of the object template;

FIG. 6 a schematic illustration of a two-dimensional contour proposal generated from the object template of FIG. 4 and FIG. 5;

FIG. 7 a schematic illustration of several two-dimensional contour proposals as they might be generated by at least one object template at different positions;

FIG. 8 a schematic illustration of best-fit contour proposals that were chosen from all contour proposals by means of a matching criterion;

FIG. 9 a schematic illustration of a selection of best-fit contour proposals that may result from applying a selection criterion; and FIG. 10 a schematic illustration of all those object templates at their respective positions inside the frustum that belong to the best-fit contour proposals of FIG. 9 and an illustration of correction data.

The embodiment explained in the following is a preferred embodiment of the invention. However, in the embodiment, the described components of the embodiment each represent individual features of the invention which are to be considered independently of each other and which each develop the invention also independently of each other and thereby are also to be regarded as a component of the invention in individual manner or in another than the shown combination. Furthermore, the described embodiment can also be supplemented by further features of the invention already described.

In the figures identical reference signs indicate elements that provide the same function.

FIG. 1 shows a motor vehicle 10 that can be, e.g., a passenger vehicle or a truck. The vehicle 10 may drive on a ground plane 11, which can be, e.g., a 30 road. While driving on the ground plane 11, an object 12 may appear in the surroundings 13 of the vehicle 10. For example, as an object 12 another vehicle may approach or pass by the vehicle 10. The vehicle 10 may comprise an electronic control unit 14 which may be designed to estimate a relative position 15 of the object 12 with regard to vehicle 10. FIG. 1 illustrates that the relative position 15 can be, e.g., the centre of object 12 or (not shown) the front end or the back end of the object 12. The relative position 15 may be described by coordinates. For better orientation, a coordinate system 16 is illustrated in FIG. 1 and the following figures. A longitudinal axis of vehicle 10 may correspond to the x-axis, a lateral axis of vehicle 10 may correspond to the y-axis and a vertical axis of vehicle 10 may correspond to the z-axis.

For estimating the relative position 15 of object 12, control unit 14 may receive from a 2D camera 17 one or more 2D camera images 18. In the following, it is assumed that the estimation of the relative position 15 is performed on a single 2D camera image. From camera 17, an image sensor 19 is shown in order to illustrate an image plane 20 on which an optical lens 21 forward-projects the light from the surroundings 13 onto the image sensor 19. On image sensor 19, the 2D camera image is generated. Based on 2D camera image 18, the electronic control unit may perform a method 22 in order to provide an estimate 23 of the relative position 15. The estimate 23 can be forwarded to, e.g., a driver assistance system which may, e.g., autonomously drive vehicle 10. FIG. 1 also illustrates the field of coverage C of the camera 17. As can be seen from FIG. 1, object 12 is within the field of coverage C and thus camera image 18 will also comprise an image of object 12. However, for estimating the relative position 15, a distance 25, which can be measured or defined along the x-axis or the longitudinal axis of vehicle 10, cannot be directly measured from the 2D camera image 18.

In order to estimate the relative position 15, electronic control unit 14 may perform method 22. For performing method 22, electronic control unit 14 may comprise a processing unit CPU, which may be based on one or more microprocessors and/or graphical processing units and/or microcontrollers. By means of the processing unit CPU, electronic control unit 14 may operate one or more artificial neural networks ANN.

FIG. 2 illustrates possible steps of method 22. The single steps of method 22 will be explained in connection with FIGS. 3 to 10.

In a first step S10, the control unit may determine an object contour of the object 12 from the camera image 18.

FIG. 3 illustrates how in the camera image 18 the object 12 can be detected. FIG. 3 illustrates that object 12 can be another vehicle which may be driving on the ground plane 11 towards vehicle 10. As an object contour 24, a 2D bounding box BB may be determined. Object 12 can be detected in image 18 on the basis of state of art image processing algorithms which can be, e.g., based on at least one artificial neural network. Additionally or alternatively, an optical flow analysis of several consecutive camera images 18 can be used.

FIG. 3 and FIG. 4 illustrate step S11 (FIG. 2) which may be performed by the control unit 14.

FIG. 4 shows a three-dimensional virtual space 26 which may be defined on the basis of the coordinate system 16, which is illustrated by the y-axis, the x-axis and the z-axis. FIG. 4 shows a top view. Starting from the image plane 20, the object contour 24 may be back-projected by a back-projection 27 into the virtual space 26. The virtual space 26 represents the surroundings 13. As the object contour 24 may describe the outer bounds of object 12, the back-projection 27 defines a three-dimensional frustum 28 which encompasses or comprises all possible positions of object 12. FIG. 4 illustrates the true position 15 of object 12 together with the true spatial orientation and true size of object 12. FIG. 3 illustrates another view of the back-projection of the object contour 24 into the surroundings 13 together with the resulting frustum 28. For purposes of orientation, FIG. 3 and FIG. 4 show a virtual backplane 29 of the three-dimensional virtual frustum 28.

FIG. 4 also illustrates a step S12 of method 22. An object classification module 30' of electronic control unit may determine at least one digital object template 30 which represents object 12.

A potential position 31 of for the determined object template 30 may be defined in a step S13 for positioning object template 30. Optionally, for object template 30 and/or for at least one other object template, further potential or possible positions 32 inside frustum 28 may be set. In FIG. 4, from all the possible positions 32 only three are indicated by a reference sign for the sake of clarity. The positions 32 may be chosen on the basis of a predefined positioning rule 33 which may define the positions 32 in a predefined raster or pattern.

Additionally, positioning rule 33 may define that positions 32 shall be arranged on the ground plane 11 and/or on at least one parallel plane parallel to ground plane 11. From positions 32, at least some differ in regard to distance 25 to the vehicle 10. A parallel plane may compensate for bumps and/or hills on a road.

FIG. 5 illustrates steps S12 and S13 further. FIG. 5 shows an object template 30 at one potential position 31. Object template 30 can be, e.g., a 3D bounding box 34. By object template 30, an object type (e.g. vehicle, pedestrian, cyclist) and/or an object size (width 35, height 36, length 37) and/or a spatial orientation 38 (e.g. defined as rotational angle around a vertical axis 39) can be represented or defined.

FIG. 4 additionally illustrates a step S14 of method 22. The object template 30 may be forward-projected by a forward-projection 40 onto the image plane 20.

In other words, an artificial image of the object template 30 at its position 31 may be generated. If the object template 30 is a 3D-bounding box 34, the forward-projection 40 may be performed by only forward-projecting corners 41 of bounding box 34. For the sake of clarity, FIGS. 4 and 5 only show two reference signs for corners 41. The forward-projections 40 may consider optical properties of lens 21 and/or so-called extrinsic and intrinsic parameters of camera 17.

FIG. 6 illustrates the result of step S14. FIG. 6 shows that additionally to object contour 24, for object template 30 at its position 31 the result of forward-projecting 40 is a two-dimensional contour proposal 42 which shows the outer lines of the artificial or virtual image of object template 30 on image plane 20.

FIG. 6 also illustrates a step S15 of method 22: The contour proposal 42 may be compared with the object contour 24 of object 12. The comparison may be performed by comparing overlapping areas 43, which is illustrated in FIG. 6 by a hatching pattern. The degree of overlap may be expressed by an overlap value (e.g. percentage of overlap). It may be verified, if the contour proposal 42 fulfils a matching criterion 44 may demand that the overlapping area 43 must be larger than a minimum percentage of the area of object contour 24 and/or contour proposal 42.

So far, method 22 has been described on the basis of one single object template 30 and its resulting contour proposal 42, if object template 30 is positioned at position 31. However, each single object template 30 is positioned at more than one position 31, as illustrated in FIG. 4 by the additional positions 32.

FIG. 7 illustrates how forward-projection 40 yields several contour proposals in step S14, one for each object template 30 at each possible position 31, 32. For each contour proposal 42, the matching criterion 44 can be applied. Those contour proposals 42 which fulfil the matching criterion 44 are denoted here as best-fit contour proposals 45'.

FIG. 8 illustrates that for each best-fit contour proposal 45 the corresponding object template 30 at its respective position 31, 32 can be determined. Each best-fit contour proposal 45 is associated with one object template 30 at a specific position 31, 32. FIG. 8 also illustrates that some object templates 30 may be very similar in size and position (note that FIG. 8 is a top view onto the virtual space 26). To this end, FIG. 8 illustrates two groups 46, wherein each group 46 consists of object templates 30, which match a predefined similarity criterion 47 with regard to position and/or size and/or object type.

FIG. 9 illustrates how, by means of the similarity criterion 47, the number of best-fit contour proposals 45 can be reduced to the selected best-fit contour proposals 45', each representing one of the groups 46. As is shown in FIG. 9, not only a single selected best-fit contour proposal 45' may be left, but more than one.

FIG. 10 illustrates a step S16 of method 22. FIG. 10 illustrates how the object templates 30 that belong to the selected best-fit contour proposals 45 may indicate two possible positions 31, 32 of object 12. By means of an artificial neural network that may be applied to image 18 and especially the regions of the selected best-fit contour proposals 45 and the object contour 24, in order to determine correction data 48 for each of positions 31, 32 of the object templates 30. By means of correction data 48, for the positions 31, 32 a respective corrected position 49 may be calculated. The corrected position 49 can be used as the estimate 23 of position 15. For generating the correction data 48, the artificial neural network ANN can be trained to associate images inside the bounds of the selected best-fit contour proposals 45' with corresponding correction data 48 in order to result in a better match of the image data encompassed by the selected best-fit contour proposals 45' in comparison to the image data encompassed by the object contour 24.

Method 22 may comprise an additional step S17, which is provided for the case that (see FIG. 7) none of the contour proposals 42 matches the matching criterion 44 in step S15, such that no best-fit contour proposal 45 can be determined in step S15. In this case, instead of step S16, step S17 can be performed. In step S17, from the image area of camera image 18 that is inside the object contour 24, by means of an artificial neural network ANN, an object estimation module 50 may be provided which directly estimates an object template that provides an estimate for object type and object size and spatial orientation of the object. This object template may be back-projected in the same way as is illustrated in FIG. 3 and FIG. 4 by the back-projection 27 for the object contour 24. The back-projection 27 may be performed for different distance values of distance 25 (see FIG. 1). This also yields several possible positions 32. From each of these possible positions 32, again, a forward-projection 40 may be performed, as is illustrated in FIG. 4 and FIG. 6. This yields contour proposals 42 in the same way as illustrated in FIG. 6. The forward-projection for the distance value of distance 25 which yields the best-matching contour proposal 45 can then be chosen as an estimate of the distance 25. This also allows for an estimate 23 of the position 15 of object 12.

The general background of the method therefore can be a monocular camera (2D camera) 3D (non-temporal) object detection. This means trying to estimate the position of objects in 3-dimensional space, including the pose, dimensions, location and class of the object based solely on a single camera frame, and known camera intrinsic and extrinsic parameters.

As part of the environment model use by an autonomous vehicle, one needs to capture dynamic objects and differentiate them from static objects. Potentially mobile objects include cars, trucks, buses, cyclists, pedestrians, animals etc. These should not only be detected in image coordinates (pixel region of interest) but also in real-world coordinates. This method described herein seeks to solve this problem in the context of mono-cameras (i.e. not using additional sensors like lidar, radar or addition stereo-vision cameras), using a single frame.

In the method described here, a 2D image detector or camera can be used to give areas of interest in the image. A rectangular area of interest (bounding box) creates a frustum in 3D, in which points from many potential (but known) locations of the 3D world can fall in, provided we know the camera instrinsic/extrinsic parameters (i.e. the properties of the lens). Given that we know already the class of the object (i.e. car, truck, pedestrian) we can select prior learnt templates for such classes which maximise the likelihood of an accurate size estimate and place them in 3D space. We then re-project in 2D and check the re-projection error of such template to the originally detected 2D bounding box. For example, within the frustum, we can have a point coming from 400 meters away; however, if we place a "car" template 3D box at this location and re-project into 2D and find that the 2D box is much smaller than the original 2D detection, we know that this location is too far. The best matching templates+locations are then refined by a neural network, which learns to correct the orientation, dimensions, and location of the template to minimize the localization loss and re-projection loss to ground truths, purely based on the camera input. For efficiency, we also make an assumption that objects are not in mid air, but relatively close to the ground plane, thereby reducing further the potential templates.

There are some caveats with this approach above—for example, one might not be able to find any templates with the right threshold. This might be because, especially at large distances, small deviations in pose and orientation might shift the 3D box so much that the re-projection error is very high, and thus no templates are proposed (all are filtered out). In these cases, or as an additional check for all cases, rather than look for templates in the frustum, we can ask another network to estimate pose R and size S of the object. Given these, we can solve for T (translation) by assuming that the 3D box fits snugly in the 2D image detection. One of the 8 points in the 3D image could potentially define either xmin, ymin, xmax or ymax of the 2D bounding box in image space, so 8**4 combinations (4096). We can solve these combinations exhaustively and pick the translation that gives the lowest re-projection error.

Overall, the example shows how a position of an external object can be estimated on the basis of a single 2D camera image by the invention.

The invention claimed is:

1. A method for determining a relative position of an object in a surroundings of a vehicle, the method comprising:
   determining, by an electronic control unit of the vehicle, an object contour of the object from a two-dimensional (2D) camera image taken by a camera of the vehicle;
   back-projecting the object contour into a three-dimensional virtual space that represents the surroundings, the back-projected object contour describing a virtual three-dimensional (3D) frustum reaching from the camera into the surroundings;
   determining at least one digital object template that represents the object;
   positioning the at least one digital object template at a plurality of predefined positions inside the frustum, the plurality of predefined positions being determined according to a predefined positioning rule;
   forward projecting the at least one digital object template from the plurality of predefined positions onto an image plane of the camera image, each forward-projected digital object template yielding a respective 2D contour proposal;
   comparing the 2D contour proposals with the object contour of the object;
   selecting, based on the comparing, at least one 2D contour proposal among the 2D contour proposals that fulfills a predefined matching criterion with respect to the object contour, as a respective best-fit contour proposal; and
   determining the relative position of the object based on the respective predefined position of each corresponding digital object template that leads to the at least one 2D contour proposal selected as the respective best-fit contour proposal.

2. The method according to claim 1, wherein the object contour corresponds to a 2D bounding box having a rectangular shape.

3. The method according to claim 1, wherein each digital object template represents a specific object type, an object size, and a spatial orientation.

4. The method according to claim 1, wherein
   determining the at least one digital object template comprises using a plurality of digital object templates, and
   at least two digital object templates among the plurality of digital object templates represent different object types and/or at least two digital object templates among the plurality of digital object templates represent different object sizes and/or at least two digital object templates among the plurality of digital object templates represent a same object type, but different potential spatial orientations of the object.

5. The method according to claim 1, wherein determining the at least one digital object template includes, determining, by an object classification module, an object type and/or an object size and/or a spatial orientation, of the object based on the camera image.

6. The method according to claim 1, wherein each digital object template is a 3D bounding box.

7. The method according to claim 1, wherein
   the predefined positioning rule comprises using a plurality of predefined positions for each digital object template, the plurality of predefined positions being arranged in a predefined pattern, and
   in the 3D virtual space a ground plane, on which the vehicle and/or the object are arranged, is represented and the plurality of predefined positions are arranged inside the frustum on the ground plane and/or on a plane parallel to the ground plane.

8. The method according to claim 1, wherein the predefined matching criterion comprises that the respective 2D contour proposal and the object contour overlap at least to a predefined minimum overlap value.

9. The method according to claim 1, wherein
selecting the at least one 2D contour proposal among the 2D contour proposals comprises selecting only some of the 2D contour proposals that fulfill the predefined matching criterion, and
selecting only some of the 2D contour proposals that fulfill the predefined matching criterion comprises applying a similarity criterion to the corresponding digital object templates and determining at least one group of similar corresponding digital object templates and only selecting one digital object template out of each group and selecting the associated best-fit contour proposal of each selected digital object template.

10. The method according to claim 1, wherein determining the relative position of the object comprises applying an artificial neural network (ANN) to each best-fit contour proposal, the ANN being trained to provide correction data for each predefined position of each corresponding digital object template that leads to the at least one 2D contour proposal, to increase a degree of matching between the best-fit contour proposal and the object contour.

11. The method according to claim 10, further comprising:
calculating corrected positions for each predefined position of each corresponding digital object template that leads to the at least one 2D contour proposal based on the correction data; and
calculating a mean value of the corrected positions as an estimate of the relative position of the object.

12. The method according to claim 1, wherein when none of the 2D contour proposals fulfills the predefined matching criterion based on the comparing, the method further comprises:
providing, by an object estimation module, an estimate of an object type, an object size, and a spatial orientation of the object based on the camera image;
back-projecting a digital object template of a corresponding object type, object size, and spatial orientation inside the frustum;
varying a projection distance and generating, for each value of the projection distance, a 2D contour proposal by forward-projecting the back-projected digital object template onto an image plane of the camera image, until a value for the projection distance is found for which the 2D contour proposal fulfills the predefined matching criterion; and
determining the relative position of the object based on the value for the projection distance found for which the 2D contour proposal fulfills the predefined matching criterion.

13. The method according to claim 12, wherein the object estimation module is configured as an artificial neural network.

14. An electronic control unit for a vehicle, comprising:
a memory configured to store instructions; and
a processor configured to execute the instructions to:
determine an object contour of the object from a two-dimensional (2D) camera image taken by a camera of the vehicle,
back-project the object contour into a three-dimensional virtual space that represents the surroundings, the back-projected object contour describing a virtual three-dimensional (3D) frustum reaching from the camera into the surroundings,
determine at least one digital object template that represents the object,
position the at least one digital object template at a plurality of predefined positions inside the frustum, the plurality of predefined positions being determined according to a predefined positioning rule,
forward project the at least one digital object template from the plurality of predefined positions onto an image plane of the camera image, each forward-projected digital object template yielding a respective 2D contour proposal,
compare the 2D contour proposals with the object contour of the object;
select, based on the comparison, at least one 2D contour proposal among the 2D contour proposals that fulfills a predefined matching criterion with respect to the object contour, as a respective best-fit contour proposal, and
determine a relative position of the object based on the respective predefined position of each corresponding digital object template that leads to the at least one 2D contour proposal selected as the respective best-fit contour proposal.

15. The electronic control unit according to claim 14, wherein the object contour corresponds to a 2D bounding box having a rectangular shape.

16. The electronic control unit according to claim 14, wherein each digital object template represents a specific object type, an object size, and a spatial orientation.

17. The electronic control unit according to claim 14, wherein the predefined matching criterion comprises that the respective 2D contour proposal and the object contour overlap at least to a predefined minimum overlap value.

18. A motor vehicle, comprising:
a two-dimensional camera; and
the electronic control unit according to claim 14.

19. The motor vehicle according to claim 18, wherein
the object contour corresponds to a 2D bounding box having a rectangular shape, and
each digital object template represents a specific object type, an object size, and a spatial orientation.

20. The motor vehicle according to claim 18, further comprising:
a driver assistance system to receive the relative position of the object from the electronic control unit, and to control the vehicle based on the relative position of the object.

* * * * *